Figure 1:
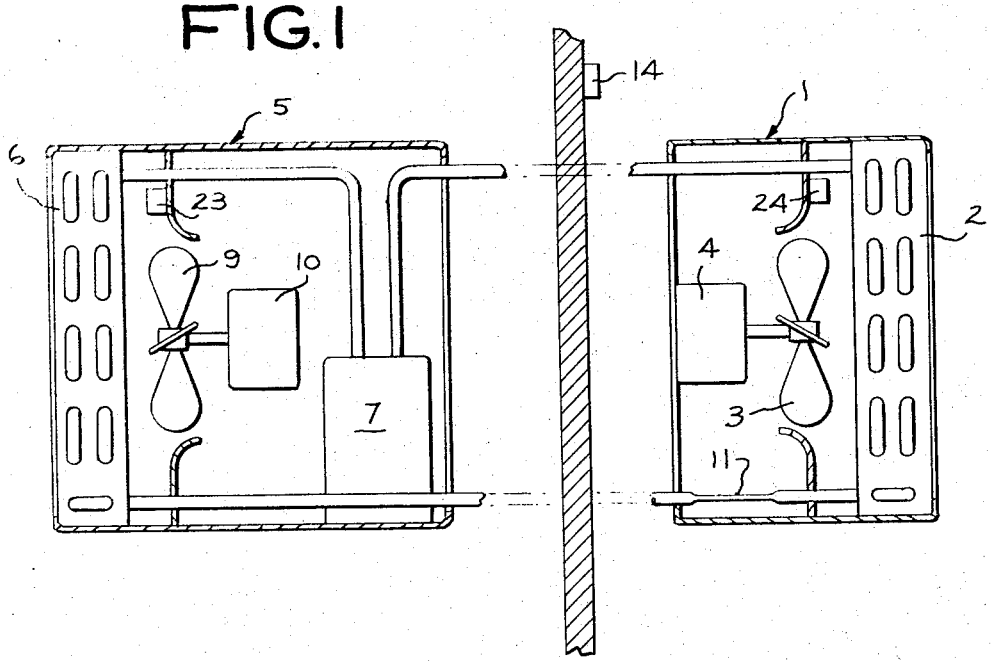

Dec. 20, 1966    D. J. HARBOUR    3,292,387
AIR CONDITIONING EQUIPMENT INCLUDING TIME
DELAY CONTROL CIRCUITRY
Filed March 30, 1965

INVENTOR.
DON J. HARBOUR
BY *Walter E. Rule*
HIS ATTORNEY

United States Patent Office 3,292,387
Patented Dec. 20, 1966

3,292,387
AIR CONDITIONING EQUIPMENT INCLUDING
TIME DELAY CONTROL CIRCUITRY
Don J. Harbour, Tyler, Tex., assignor to General Electric
Company, a corporation of New York
Filed Mar. 30, 1965, Ser. No. 443,994
8 Claims. (Cl. 62—158)

The present invention relates to air conditioning equipment, that is, equipment for cooling or heating air supplied to an enclosure and is particularly concerned with circuitry designed to prevent short cycling of certain components of the equipment.

Conventional air conditioning equipment comprises means for conditioning, that is heating or cooling, the air supplied to an enclosure and air circulating means for supplying the conditioned air to the enclosure. Both the conditioning component and the air circulating component are generally powered or driven by electric motors. The operation of such equipment is normally controlled by a thermostat responsive to the temperature of the air within the enclosure. In air conditioning equipment including a refrigeration circuit for either cooling or both heating and cooling applications, the erratic operation of the room thermostat causes rapid cycling of other control components, motors, etc., which leads to premature failure of these control components and motors. A number of devices are presently available and being used to create a time delay such that erratic or rapid signals from the thermostat are not passed on to the rest of the circuit. Bimetallic warp switches and time delay relays have been employed. However, many of these have a chattering characteristic of their own and add to the problem rather than solve it. Motor driven timer circuits have also been employed but these circuits due to their complexity introduce additional components subject to failure.

A general object of the present invention is to provide air conditioning equipment including electric motor driven conditioning means for conditioning the air to be supplied to an enclosure, electric motor driven air circulating means for supplying the conditioned air to the enclosure and electrical control circuitry including a thermostat for controlling the operation thereof designed to prevent energization of the conditioning means due to erratic or quick cycling operation of the control thermostat.

Another object of the invention is to provide a control circuit for air conditioning equipment in which the time required for the air circulating means to come up to speed protects the air conditioning component from rapid cycling due to momentary erratic operation of the control thermostat.

Further objects and advantages of the invention will become apparent as the following description proceeds and the features of novelty which characterize the invention will be pointed out with particularity in the claims annexed to and forming part of this specification.

In accordance with the illustrated embodiment of the present invention, there is provided air conditioning equipment comprising a conditioning component in the form of a refrigeration system for cooling the air supplied to an enclosure and including a motor driven compressor and indoor and outdoor heat exchangers connected to form a closed refrigerant circuit. Motor driven fan means are provided for circulating air through at least one of the heat exchangers. The operation of the air conditioning equipment is under control of a room thermostat responsive to the temperature of the enclosure being supplied with the conditioned air. To avoid quick starting and stopping of the compressor motor due to erratic or quick cycling operation of the room thermostat, the electrical control circuitry comprises a first circuit component by means of which the operation of the fan motor is controlled by the room thermostat and a second circuit component energizing the compressor motor only after the fan means has at least approached normal operating speed. Since fan motors require several seconds to come up to speed, energization of the compressor motor is delayed about the same period of time thereby preventing energization of the compressor motor due to any momentary closing and opening of the thermostat contacts.

Figure 2:
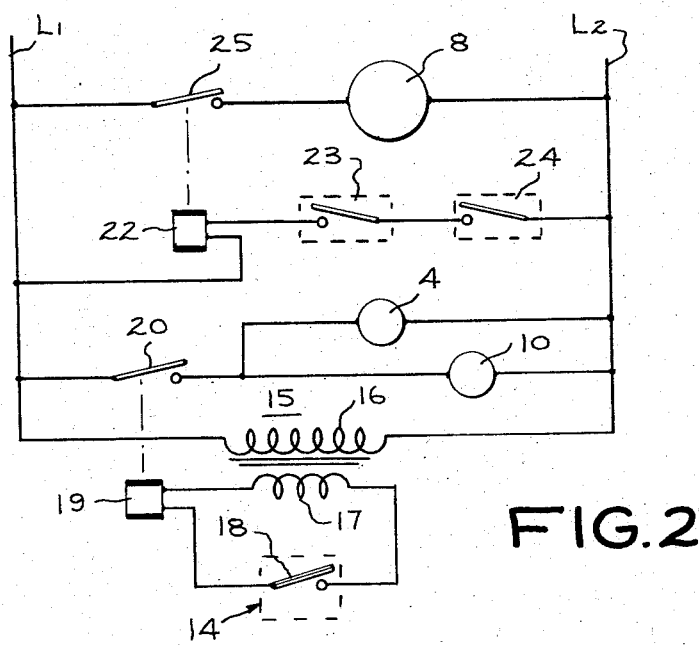

For a better understanding of the invention reference may be had to the accompanying drawing in which:

FIGURE 1 illustrates the air conditioning components of an air conditioning system of the refrigeration type; and FIGURE 2 is a schematic wiring diagram of control circuitry embodying the present invention.

While, as has been indicated hereinbefore, the present invention is directed to air conditioning equipment of various types employed either for cooling or for heating or for both heating and cooling air supplied to an enclosure, it will be particularly described with reference to air conditioning equipment including a simple refrigeration system designed for cooling the air supplied to the enclosure.

In the embodiment of the invention illustrated in FIGURE 1 of the drawing, such equipment includes an indoor unit 1 including a heat exchanger 2 operating as an evaporator and a fan 3 driven by an electric motor 4 for circulating air to be conditioned through the heat exchanger 2 and supplying the conditioned air to the enclosure. The equipment also includes an outdoor unit 5 comprising an outdoor heat exchanger 6 operating as a condenser and a hermetic compressor 7 driven by a motor 8 (FIGURE 2). A fan 9 driven by a motor 10 is provided for circulating outdoor air over the heat exchanger 6 for the purpose of cooling and condensing refrigerant contained therein.

In such a system, the compressor 7, the condenser 6, a flow restrictor such as capillary tube 11, and the indoor heat exchanger 2 are connected in closed, series-flow refrigerant circuit whereby the compressor withdraws vaporized refrigerant from the indoor heat exchanger 2 functioning as an evaporator and discharges warm high pressure refrigerant to the outdoor heat exchanger 6 in which it is cooled and condensed by the air circulated through that heat exchanger by means of the fan 9. The condensed refrigerant is supplied through the flow restrictor 11 to the indoor heat exchanger 2 where it evaporates and thereby cools the air circulated through the indoor heat exchanger by means of the fan 3. A room thermostat indicated by the numeral 14, positioned at some point within the enclosure, is designed to control the operation of the air conditioning equipment in order to maintain the temperature of the air within the enclosure within predetermined limits.

During normal operation of air conditioning equipment of this type, the compressor motor and the two fan motors are energized for an appreciable period of time when the thermostat 14 calls for cooling and when these requirements are met the compressor and fan motors are de-energized until such time as cooling is again called for by the thermostat. If the thermostat 14 is employed for directly controlling the operation of the compressor motor 8, any type of jiggling or vibration thereof which causes a momentary closing of its contacts rapidly starts and stops the compressor causing abnormal wear on various components of the air conditioning unit and particularly on the compressor and the compressor motor.

In accordance with the present invention such abnormal quick cycling of the room thermostat is prevented from energizing the compressor motor 8. To this end advantage is taken of the fact that the time necessary for a fan motor, such as the fan motors 4 and 10, to come up to speed normally provides sufficient time delay to take care of any period of erratic or quick cycling of the room thermostat. To this end the control circuitry illustrated in FIGURE 2 of the drawing comprises a transformer 15 having its primary 16 connected directly across the supply lines L1 and L2 and its secondary winding 17 forming part of the circuit including a switch 18 forming part of the thermostat structure 14 and a relay coil 19. Energization of the relay coil 19 upon closing of contacts 18 closes switch contacts 20 to energize the indoor and outdoor fan motors 4 and 10.

The compressor motor 8 is energized only after a suitable time delay represented by the time one or both of the motors 4 and 10 require to come up to speed. For most fan motors, this is a period of from 3 to 6 seconds. For this purpose, there is provided a relay switch including a relay coil 22 and switch contacts 25 for connecting the compressor 8 across lines L1 and L2. Energization of coil 22 is controlled by one or more switch means 23 and 24 operable to close contacts 25 when one or both motors 4 and 10 are up to speed.

A preferred switch means for controlling the energization of the compressor motor 8 which also insures that the air flow with reference to the heat exchanger is normal before the motor 8 is started comprises one or two pressure actuated switches 23 and 24 positioned as illustrated in FIGURE 1 of the drawing between the fan or fans and the heat exchanger or heat exchangers associated therewith. Pressure responsive or pressure actuated switches such as diaphragm switches, are well known in the art. When both of the fans are operating and due to the resistance to air flow provided by the heat exchanges downstream from the fans, the air pressures betwen the fans and the heat exchangers will increase. This increase in pressure causes the pressure responsive switches 23 and 24 to close and complete the circuit for energizing the relay coil 22 thereby closing switch contacts 25 and energizing the compressor motor 8.

As the fan motors and hence the pressure conditions necessary to actuate the switches 23 and 24 require several seconds to come up to normal, the delay provided in this period of time. It is sufficient to prevent the compressor motor or other components associated with the control circuitry including the compressor motor 8 from being energized as a result of quick cycling of an erratic room thermostat. Also, since the fan motors must be up to speed and delivering normal air flow before the compressor starts, there is never a condition where high refrigerant pressures can develop due to not having air flow over the heat exchanges. This makes it possible to eliminate high pressure safety switches from the system. Another advantage of the control scheme of the present invention is the fact that the fan or fans are brought to or substantially to full air flow prior to energizing of the compressor motor thereby assisting in equalizing refrigerant pressures within the refrigeration system. Therefore, the compressor starts under a less loaded condition so that compressor motors having less starting torque, such as permanent split capacitor compresor motors may be employed for driving the compressor.

An alternative means for providing the time delay, involves the use of switches which are responsive directly to the change in motor speed, voltage or current during the time that it is accelerating to normal operation. For example, well known centrifugal switches may be employed or, alternatively, switch means operable upon the change in current or voltage conditions or the disconnecting of the start winding in motors including both a start and a run winding may be used to initiate energization of the compressor motor 8. However, means responsive to fan motor operation rather than to fan operation does not guarantee that there is also air flow since occasionally fan blades or blower wheels may come loose from the motor shaft so that even if the motor is operating there may be no air flow over the heat exchanger.

While the invention has been described with particular reference to a single refrigeration system for cooling an enclosure, it will be understood that it is not limited thereto. For example, it is equally applicable to heat pumps or reversible refrigeration systems which are employed for cooling or for heating purposes.

It will also be obvious that, while in the preferred embodiment of the present invention, the time delay switch means for delaying the operation of the compressor motor are associated with the fans for both the indoor and the outdoor heat exchangers, it is possible to obtain many of the advantages of the present invention employing only one such switch means for energizing the relay coil 22.

Therefore, while there has been shown and described what is presently considered to be a preferred embodiment of the present invention, it will be understood that it is not limited thereto and it is intended by the appended claims to cover all such changes and modifications as fall within the true spirit and scope of the invention.

What I claim as new and desire to secure by Letters Patent of the United States is:

1. In an air conditioning system comprising means including a drive motor for conditioning air to be supplied to an enclosure and air circulating means operable upon energization thereof for delivering the conditioned air to the enclosure, a control circuit comprising:
   means responsive to the condition of the air within the enclosure for energizing said air circulating means, and
   means responsive to the operation of said air circulating means for energizing said drive motor.

2. In an air conditioning system comprising a refrigeration system including a compressor driven by a drive motor for conditioning air to be supplied to an enclosure and air circulating means operable upon energization thereof for delivering the conditioned air to the enclosure, a control circuit comprising:
   means responsive to the condition of the air within the enclosure for energizing said air circulating means, and
   means responsive to the operation of said air circulating means for energizing said drive motor.

3. An electrical control circuit for controlling the operation of an air conditioning system including a refrigeration circuit comprising a compressor, a compressor motor for driving the compressor and a heat exchanger, a fan for passing air through the heat exchanger and a fan motor for driving the fan; said control circuit comprising:
   temperature responsive means for energizing said fan motor,
   and means operable only after said fan motor attains its normal operation speed for energizing said compressor motor.

4. An electrical control circuit for controlling the operation of an air conditioning system including a refrigeration circuit comprising a compressor, a compressor motor for driving the compressor and a heat exchanger, a fan for passing air through the heat exchanger and a fan motor for driving the fan; said control circuit comprising:
   temperature responsive means for energizing said fan motor,
   and means responsive to the flow of air from said fan for energizing said compressor motor.

5. An electrical control circuit for controlling the operation of an air conditioning system including a refrigeration circuit comprising a compressor, a compressor motor for driving the compressor, a heat exchanger, and a fan for passing air through the heat exchanger and a fan motor for driving the fan; said control circuit comprising:
   temperature responsive means including switch contacts for energizing said fan motor, and means between said fan and said heat exchanger operable only upon said fan attaining its normal operation speed for energizing said compressor motor whereby said compressor motor will not be energized by momentary closing of said switch contacts or when there is insufficient air flow through said heat exchanger.

6. In an air conditioning unit, the combination comprising:
   a refrigerating system for conditioning air supplied to an enclosure comprising a compressor, a first heat exchanger, refrigerant flow control means and a second heat exchanger connected in refrigerant flow relationship,
   a first electric motor for driving said compressor,
   air circulating means associated with at least one of said heat exchangers for circulating a stream of air therethrough and a second electric motor for driving said air circulating means,
   condition responsive switch means responsive to the condition of the air in said enclosure,
   a control circuit including said condition responsive means for energizing said second electric motor,
   and means operable in response to the air circulating operation of said air circulating means for energizing said first electric motor.

7. In an air conditioning unit, the combination comprising:
   a refrigerating system for conditioning air supplied to an enclosure comprising a compressor, a first heat exchanger, refrigerant flow control means and a second heat exchanger connected in refrigerant flow relationship,
   a first electric motor for driving said compressor,
   air circulating means associated with each of said heat exchangers for circulating a stream of air therethrough and a second electric motor for driving at least one of said air circulating means,
   condition responsive switch means responsive to the condition of the air in said enclosure,
   a control circuit including said condition responsive means for energizing said second electric motor,
   and means operable in response to the air circulating operation of said air circulating means for energizing said first electric motor.

8. In an air conditioning unit, the combination comprising:
   a refrigerating system for conditioning air supplied to an enclosure comprising a compressor, a first heat exchanger, refrigerant flow control means and a second heat exchanger connected in refrigerant flow relationship,
   a first electric motor for driving said compressor,
   air circulating means associated with each of said heat exchangers for circulating a stream of air therethrough and additional electric motors for driving each of said air circulating means,
   condition responsive switch means responsive to the condition of the air in said enclosure,
   a control circuit including said condition responsive means for energizing both of said additional electric motors driving said air circulating means,
   and means operable upon air circulating operation of both said air circulating means for energizing said first electric motor.

References Cited by the Examiner

UNITED STATES PATENTS

| | | | |
|---|---|---|---|
| 3,053,057 | 9/1962 | McGrath | 62—158 |
| 3,054,271 | 9/1962 | McGrath | 62—89 |
| 3,066,496 | 12/1962 | Jokela | 62—140 |
| 3,077,747 | 2/1963 | Johnson | 62—140 |
| 3,127,754 | 4/1964 | Mobarry | 62—158 |

MEYER PERLIN, *Primary Examiner.*